United States Patent [19]
Land

[11] 3,832,031
[45] Aug. 27, 1974

[54] PROJECTION SYSTEM
[75] Inventor: Edwin H. Land, Cambridge, Mass.
[73] Assignee: Polaroid Corporation, Cambridge, Mass.
[22] Filed: Dec. 24, 1969
[21] Appl. No.: 887,996

[52] U.S. Cl. ............................................. 350/117
[51] Int. Cl. ......................................... G03b 21/56
[58] Field of Search ........... 350/117; 264/1; 353/79

[56] References Cited
UNITED STATES PATENTS
2,928,131  3/1960  Mahler ........................ 350/117 UX
3,390,991  7/1968  Cook .................................... 96/29

FOREIGN PATENTS OR APPLICATIONS
104,711  3/1917  Great Britain ...................... 350/117

*Primary Examiner*—Donald O. Woodiel
*Attorney, Agent, or Firm*—Philip G. Kiely

[57] ABSTRACT

A projection system, particularly a rear, or backlighted, projection system, wherein the screen is composed of a synthetic polymeric film, at least one surface of said film having been contacted with a solvent therefor for a time sufficient to impart translucency to said film.

5 Claims, 4 Drawing Figures

PROJECTION SYSTEM

BACKGROUND OF THE INVENTION

In the past, sheets of ground glass have been widely used as projection screens, particularly for use in a rear, or back-lighted, projection system, that is, a projection system wherein the screen is located between the viewer and the image projector and wherein the image is projected on one side of the screen and observed on the opposite side.

Ground glass sheets possess a number of desirable characteristics for such a projection system, particularly the property of light transmission, i.e., a relatively large percentage of the light impinging on the rear of the screen from the projector passes through the screen and is observable by the viewer. The diffuse transmission is also relatively high with respect to total transmission; thus, such screens are characterized as good diffusers. The term diffuse is intended to refer to a screen wherein each point in the screen acts as a light source. However, ground glass screens are relatively expensive and fragile, but most importantly, are deficient with respect to viewing angle; that is, the transmitted light intensity drops extremely rapidly with respect to viewers located at an increasing horizontal angle from the axis of the central beam of light from the screen. Thus, the light intensity drops rapidly when an observer is as little as 10° to 15° off the horizontal axis of the central beam of light which is perpendicular to the plane of the screen. As a result, it is necessary for the viewers to be located as close as possible to the axis of the central beam, thus drastically limiting the optimum viewing area.

More recently, a filled plastic sheet has been employed and sold commercially as a screen for rear projection systems. However, while such materials have fairly good transmission and absorption properties, i.e., relatively large amounts of light are transmitted but relatively little absorbed by the screen; when employed with colored projected images, they are found to absorb unequally across the visible spectrum. Thus, while the ideal projection screen would possess a flat absorption curve in the visible region, that is, absorbing each color to an equal degree, the aforementioned commercial materials are deficient in this respect, and therefore, to present a relatively accurate projected image, with respect to color, would require intensifying or modulating the various colors in the image to be projected to compensate for the color absorption deficiencies of the screen. In addition, diffuse transmission is considerably less than total transmission, indicating a low-efficiency screen. Diffuse transmission is, of course, one of the most significant and sought-after properties of a rear projection screen.

This invention contemplates a novel projection system employing a projection screen which is not susceptible to the deficiencies of the prior art and which possesses characteristics not found in the prior art.

BRIEF SUMMARY OF THE INVENTION

Figure 1:
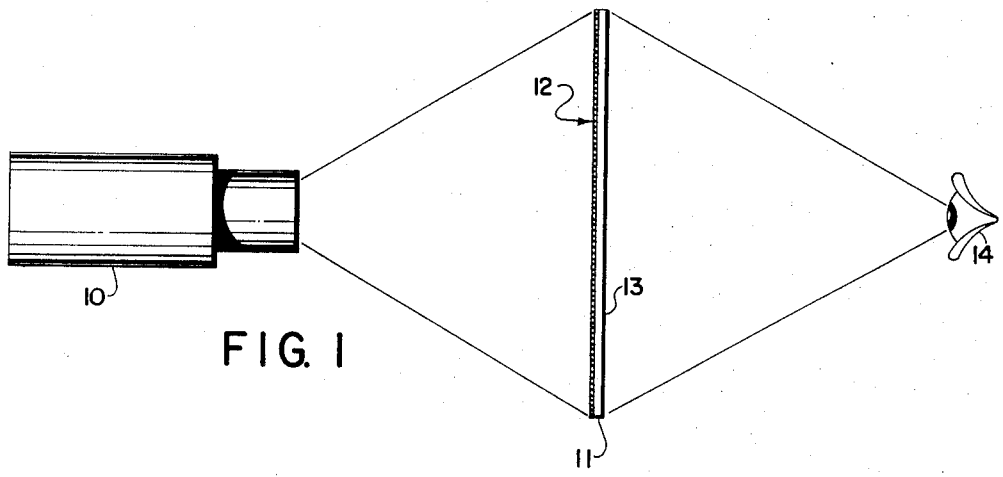
FIG. 1 is a schematic illustration of a back-lighted projection system of the present invention.

The novel projection system of the present invention comprises an image projector and, as a screen positioned in the focal plane of said image projector, a sheet of translucent polymeric material which comprises a sheet of transparent synthetic polymeric material, at least one surface of which has been contacted with a solvent therefor for a time sufficient to impart translucency to said sheet. It is preferred that only one side of the polymeric material be solvent treated.

The screen is particularly suitable for use in back-lighted or rear projectors because of the unexpected advantageous properties obtained therefrom, particularly when used in a projection system of a relatively small size, e.g., a screen of about one square foot.

DETAILED DESCRIPTION OF THE INVENTION

The projection system of the present invention employs a screen composed of a normally transparent sheet of synthetic polymeric material at least one surface of which has been treated with one or more solvents for a time sufficient to impart translucency to said sheet. Such translucent sheets are known to the art; for example, U.S. Pat. No. 3,390,991, issued July 2, 1968, discloses the use of such material as a component of a photographic image-receiving element. It has unexpectedly now been found that such materials are particularly suitable for use as screens for rear projection systems.

The projection system of the present invention comprises an image projector composed of a light source, and a lens, which may be adjustably focused, and adapted to mountably retain an image, i.e., a transparency or cinefilm between the light source and the lens, and, positioned in the focal plane of the image projector, the above-described translucent screen.

The polymeric sheet material, when a surface is treated with a solvent therefor, becomes translucent and exhibits a number of unusual and unexpected properties when employed as a projection screen.

The optical characteristics of the aforementioned screen shows that, in the visible region, that is, within the range of eye response, (about 450 to 725 m$\mu$.) an essentially flat absorption curve is observed, indicating that all colors contained in the image projected thereon will be faithfully reproduced without change in intensity or shade due to selective absorption by the screen. With regard to the viewing angle, the screen of the present invention provides greater light intensity at a greater horizontal deviation from the axis of the central beam than do either ground glass screens or the aforementioned commercially available polymeric screens constructed of filled polymeric material, e.g., polyvinyl chloride. For example, at an angle of 40° from the perpendicular, the light intensity measured with commercial polymeric screens is found to be only approximately one-sixth of that measured along the axis of the central beam, whereas with the screen of the present invention at 40° from the perpendicular, the light intensity is as high as one-third of the intensity measured along the axis of the central beam. From a practical point of view, therefore, it will be noted that the viewing audience can be located at a wider viewing angle to the screen of the present invention than could audiences viewing prior art projection systems, and with greater clarity and faithfullness of reproduction of the projected image.

The most significant and advantageous property provided by the screen of the present invention is the relatively high diffuse transmission. In the screens of the present invention, the diffuse transmission differs only slightly from the total transmission; unlike prior art screens, the diffuse transmission is substantially equal to the total transmission. It should also be noted that the ratio of diffuse to total transmission remains relatively high as the angle from the central beam increases. While the light intensity will diminish as the angle increases, the intensity diminishes only very slightly through a relatively large angle. In the screens of the present invention, "hot spots" or concentrations of undiffused light will not be observed because of the superior light diffusion characteristics.

In an alternative embodiment both surfaces of the polymeric material are contacted with solvents to provide the required translucency. In the treatment of both sides, less transmission of light is observed. Greater diffusibility is noted with the increased surface treatment, either with single surface treatment or double surface treatment; and diffuse transmission is essentially equal to total transmission. The flat absorption curve over the visible range is retained and a still wider viewing angle than that achieved with screens having a single surface treatment as a result of the increased diffuse transmission.

In still another alternative embodiment, in order to minimize front reflectance on the screen, that is, reflection from light located in the room near the observers which may be reflected by the screen, it may be desirable to employ a neutral density filter with the screen, locating said filter between the screen and the observer. However, the employment of the neutral density filter does not reduce to any significant degree the transmission characteristics of the screen.

The novel projection system of the present invention is schematically illustrated in FIG. 1 wherein a conventional image projector 10, e.g., a still projector or motion picture projector composed of a light source, means for retaining an image to be projected and a suitable lens system, projects an image onto one surface of translucent screen 11 which image is viewed on the opposite side by observer 14. As illustrated in FIG. 1, the image is projected on side 12 of the screen which, as illustrated, is the side which has been contacted with the solvent to impart translucency. Side 13, as illustrated in FIG. 1, has not been contacted with a solvent.

Figure 2:
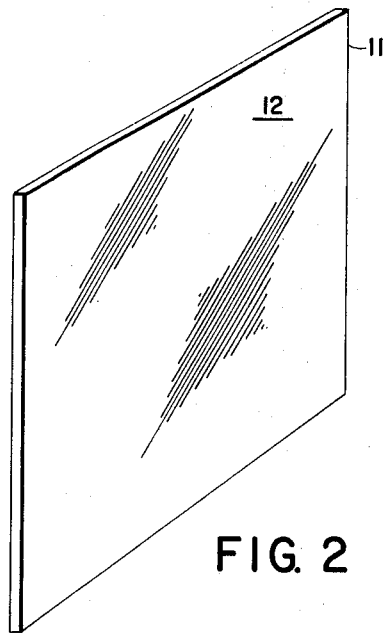
FIG. 2 is a perspective view of the screen employed in the present invention.

FIG. 2 illustrates in greater detail a screen suitable for use in the present invention wherein screen 11 is composed of a suitable polymer, for example, biaxially oriented polystyrene, wherein surface 12 has been contacted with a solvent, for example, acetone or dimethyl ketone, in the case of polystyrene, to impart translucency to said surface 12.

Figure 3:
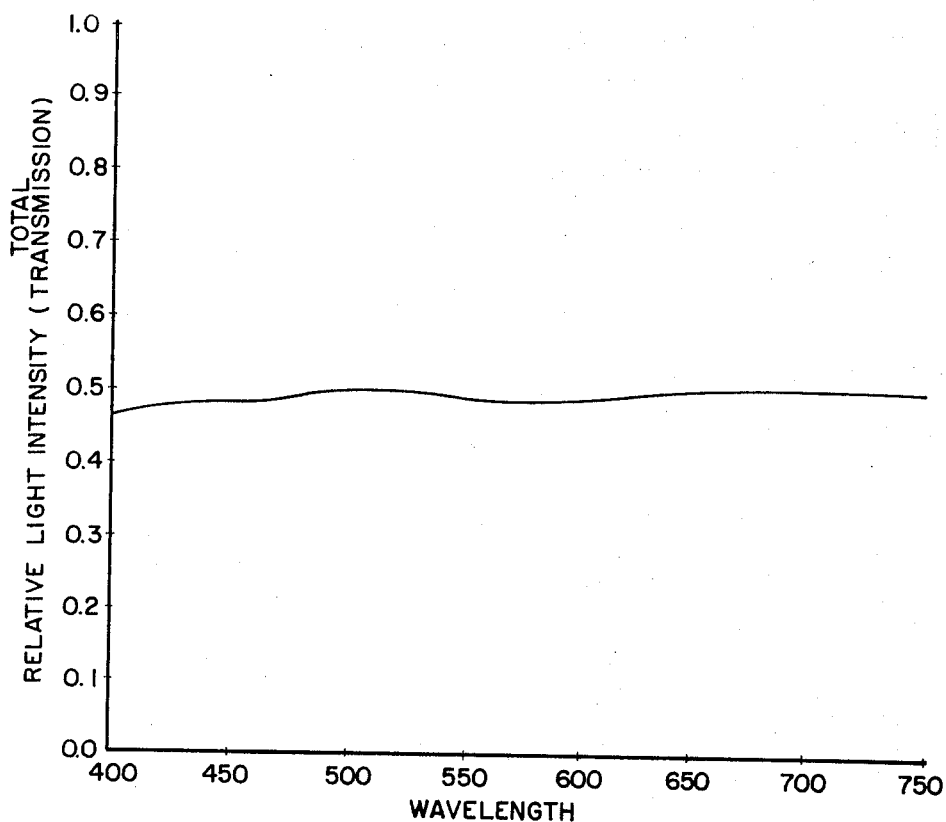
FIG. 3 is a graphic illustration of the transmission characteristics of the screen of the present invention.

FIG. 3 shows a plot of light transmission as a function of wavelength for a screen comprising biaxially oriented polystyrene which has been solvent treated on a single surface with a first solution consisting of 95 percent dimethylketone and 5 percent methyl alcohol for 10–20 sec. at ambient temperatures and then with a second solution of dimethylketone for 5–10 sec. The relative humidity was in excess of 75 percent. It will be seen that in this embodiment of the present invention, absorption is constant with changing wavelength over the entire visible range, thus, providing an accuracy of reproduction to the projected image to a degree heretofore not found in prior art screens.

Figure 4:
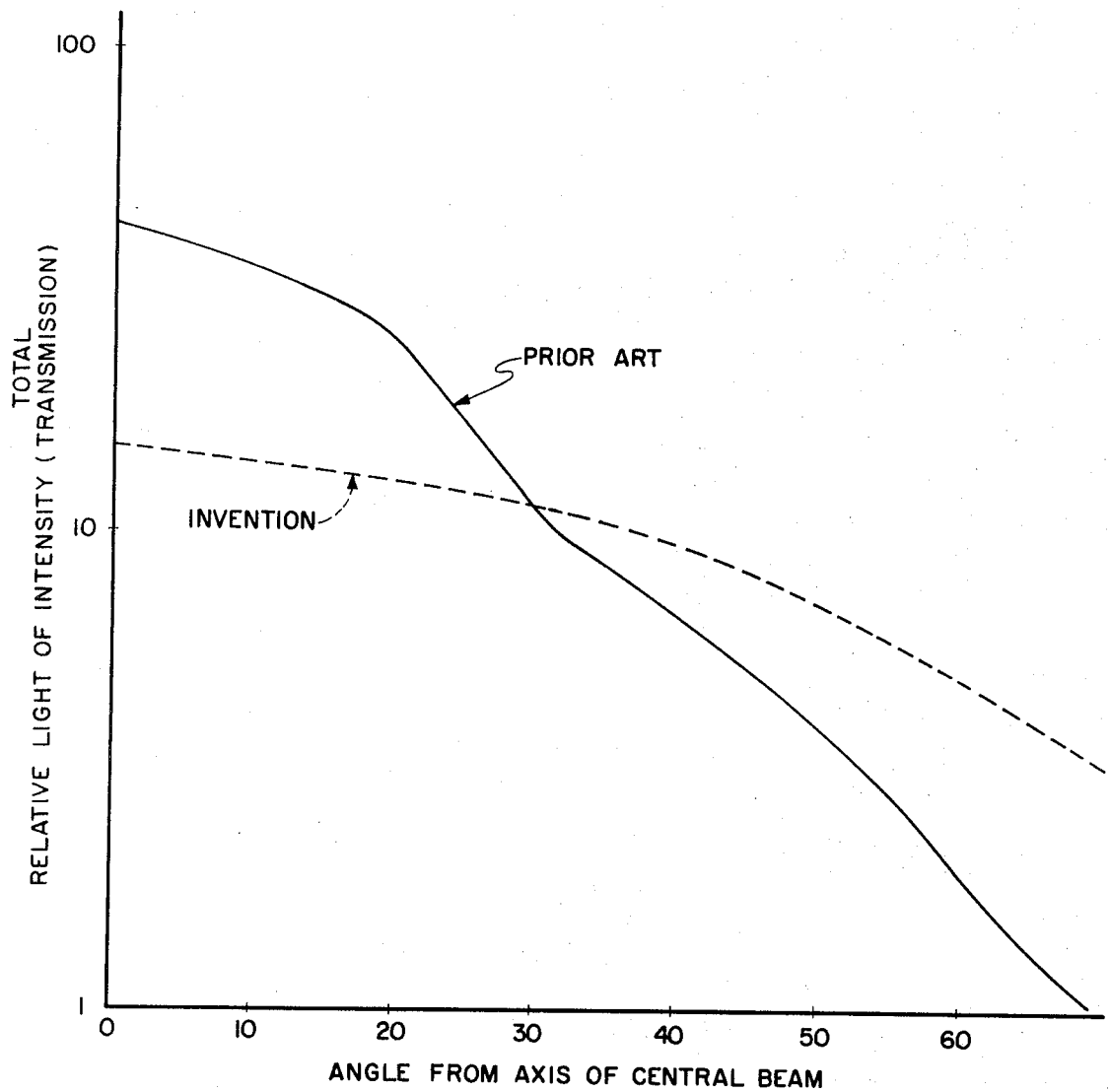
FIG. 4 is a graphic illustration of the comparison of changes in light intensity as the viewing angle from the central beam increases between the screen of the present invention and a commercial screen.

FIG. 4 is a graphical representation of the changes in light intensity as the viewing angle from the axis of the central beam changes. The dotted line shows a screen of the present invention comprising biaxially oriented polystyrene wherein one side had been contacted with the two solutions of dimethylketone described above. The solid line represents the relative light distribution of a prior art polymeric screen which is commercially available (Polacoat Inc., Cincinatti, Ohio, LS60 FM Rear Projection Screen) which is composed of a sheet of plasticized polyvinyl chloride resin having kaolin clay milled therein at a coverage of about 2.8 grams/ft.$^2$. It will be noted that the gradual slope of the dotted line indicates the only slight loss in transmitted light intensity as the angle from the central beam increased. The very rapid decline of the solid line, however, indicates that the clarity and reproducibility of the projected image diminishes rapidly as the angle increases. This graph indicates that the available viewing area, i.e., the cone generated by angles on either side of the axis of the central beam of light transmitted through the screen, is much greater with the screen of the present invention than that available with the designated prior art screen.

The thickness of the screen employed is not critical. The screen may comprise a polymeric film as little as 3 to 5 mils in thickness or it may be 10 to 100 mils in thickness. Preferably, the screen is mounted in a suitable retaining frame. The thicker screens will not require additional support since they generally will be sufficiently dimensionally stable in themselves. However, in employing the thinner screens, in order to prevent damage in handling or the like, it may be desirable to laminate the aforementioned screen to a dimensionally stable base, for example, glass or a polymeric sheet, e.g., methylmethacrylate, of sufficient thickness to provide the desired dimensional stability.

While it is preferred that the projected light beam is incident on the side of the screen which has been contacted with the solvent, it should be understood that either side of the screen may be employed.

The novel screen of the present invention may be prepared from any suitable polymeric material which can be cast or extruded into a clear film which then can be rendered translucent by the application of the appropriate solvent to one or both surfaces. As examples of suitable polymers for use in the present invention, mention may be made of polystyrene and copolymers thereof, particularly styrene/butadiene copolymers, styrene/butadiene/acrylonitrile copolymers, acrylates, polyesters, polyvinyl acetate, polyvinyl alcohol, polyvinyl butyrate, cellulose acetate, cellulose acetate butyrate, and the like.

The preferred polymeric materials include biaxially oriented polystyrene and styrene/butadiene copolymer. Such materials are well known and commercially available. The polymeric materials are generally prepared by casting or extruding the polymerized material as a sheet and then biaxially stretching the sheet in a heated condition to orient the polymer chains within the sheet material. The sheet material is then cooled below the first order transition temperature in order to "freeze" the oriented polymer chains while still under tension. The polymeric sheet material as well as being transparent possesses strength exceeding that of nonoriented polymeric sheet material. In preparing the translucent sheet materials at least one surface of the biaxially oriented polystyrene or styrene/butadiene copolymer is treated with a conventional solvent for said polymers. It is believed that the treatment with the solvent softens the surface of the polymer allowing the polymer chains to be released from the orientation in which they were formed and to become disoriented. The disorientation provides a surface to the polymeric sheet material which is translucent and possesses the aforementioned highly desirable transmission and diffusion qualities.

The solvents which can be employed in forming the novel screens of the present invention are conventional solvents which are well known to the art and which can be readily selected by one skilled in the art with reference to the particular polymer to be treated. For styrene polymers and copolymers suitable solvents include: toluol, N-heptane, methylene dichloride, ethylene dichloride, ketones, such as acetone and dimethyl ketone, and the like. Preferred solvents for styrene polymers and copolymers include acetone and dimethyl ketone as well as the aforementioned ketones with a small amount of methyl alcohol included therein to provide for rapid treatment of the material as well as a rapid drying of the sheet material and removal of the solvent subsequent to the desired treatment.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. In a rear projection system which includes an image projector and a screen positioned in the focal plane of said image porjector, said projector adapted to project a color image onto said screen, the improvement which comprises employing as a screen an initially transparent biaxially oriented polystyrene sheet wherein at least one surface of said sheet has been contacted substantially evenly, subsequent to orientation with a solvent therefor for a time sufficient to provide translucency to said sheet.

2. A product as defined in claim 1 wherein said solvent is a ketone.

3. A product as defined in claim 1 wherein said sheet is laminated to a transparent dimensionally stable support.

4. A product as defined in claim 3 wherein said support is glass.

5. A product as defined in claim 3 wherein said support is polymethyl methacrylate.

* * * * *